H. BESCHKEE.
Evaporating Pan.
No. 70,943.
2 Sheets—Sheet 1.
Patented Nov. 19, 1867.
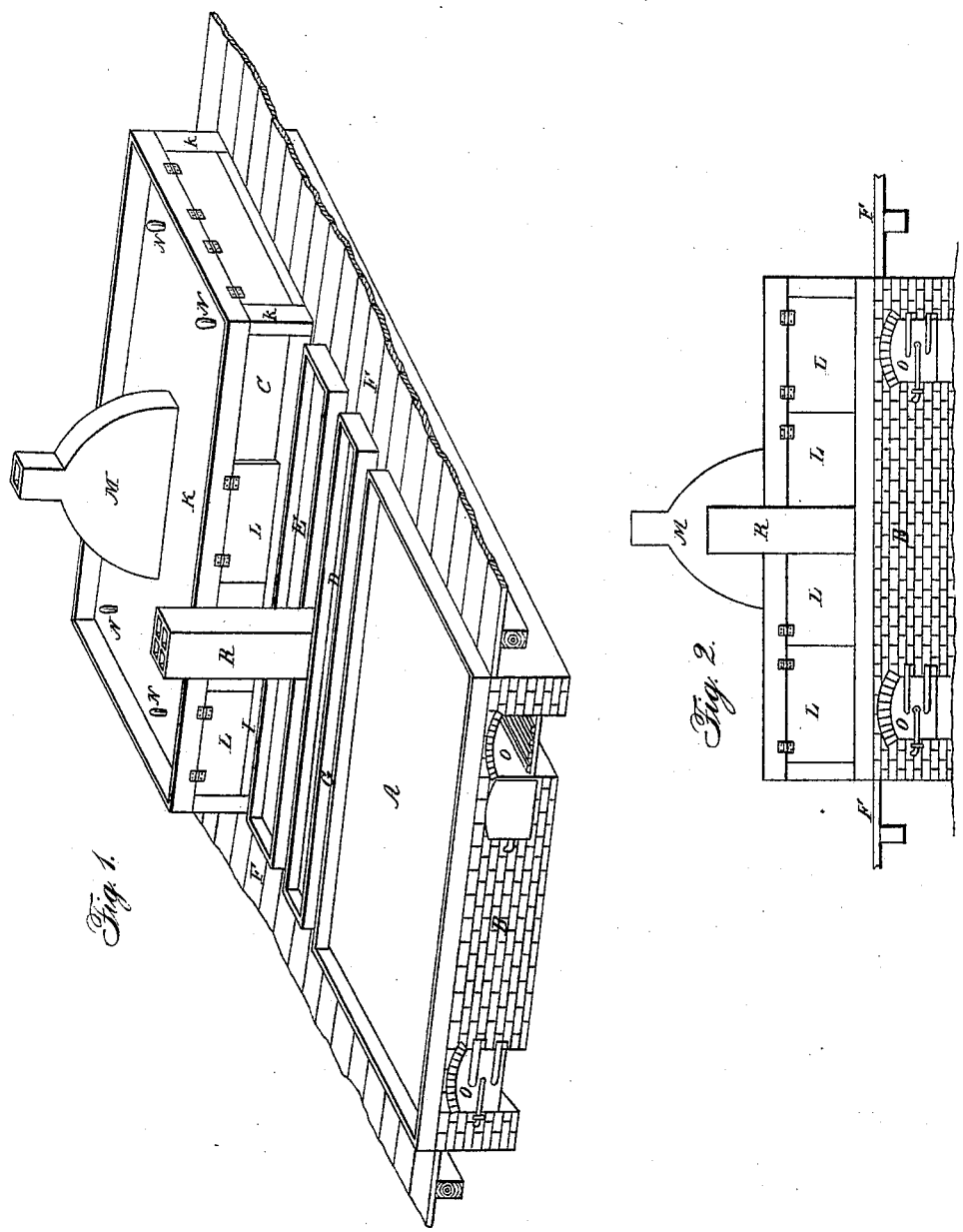
Witnesses:
W. N. Walton.
Thos. T. Everett.
Inventor:
Henry Beschkee
by his Atty S. F. Reigart H. BESCHKEE.
Evaporating Pan.

No. 70,943.

2 Sheets—Sheet 2.

Patented Nov. 19, 1867.

Witnesses:
W. N. Walton
Thos. T. Everett.

Inventor:
Henry Beschkee
by his Atty J. F. Reigart

United States Patent Office.

HENRY BESCHKEE, OF ALBANY, NEW YORK.

Letters Patent No. 70,943, dated November 19, 1867.

---

IMPROVED APPARATUS FOR THE MANUFACTURE OF SALT.

---

The Schedule referred to in these Letters Patent and making part of the same.

---

TO ALL WHOM IT MAY CONCERN:

Be it known that I, HENRY BESCHKEE, of Albany, in the county of Albany, and State of New York, have invented a new "Apparatus for Manufacturing Salt;" and I do hereby declare the following to be an exact description thereof, reference being had to the accompanying drawings, and to the letters of reference marked thereon, making a part of this specification, in which—

Figure 1 represents a perspective view of the apparatus.

Figure 2 an end view of the same.

Figure 3:
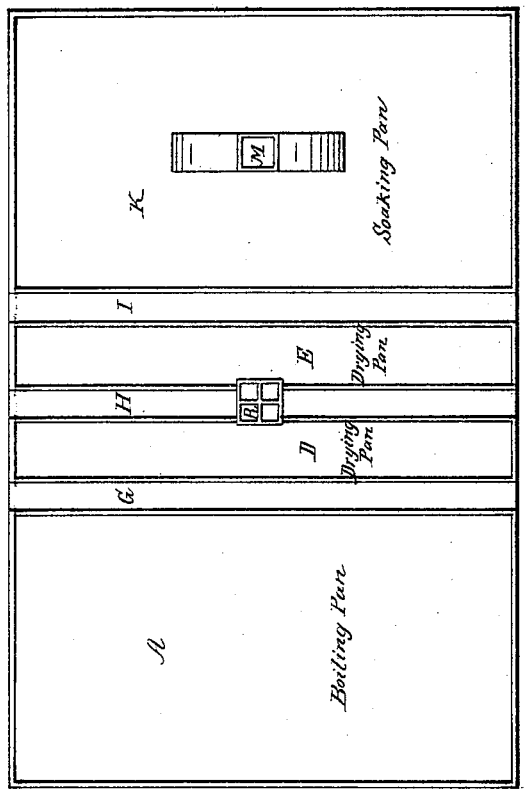

Figure 3 a plan of the same.

Figure 4:
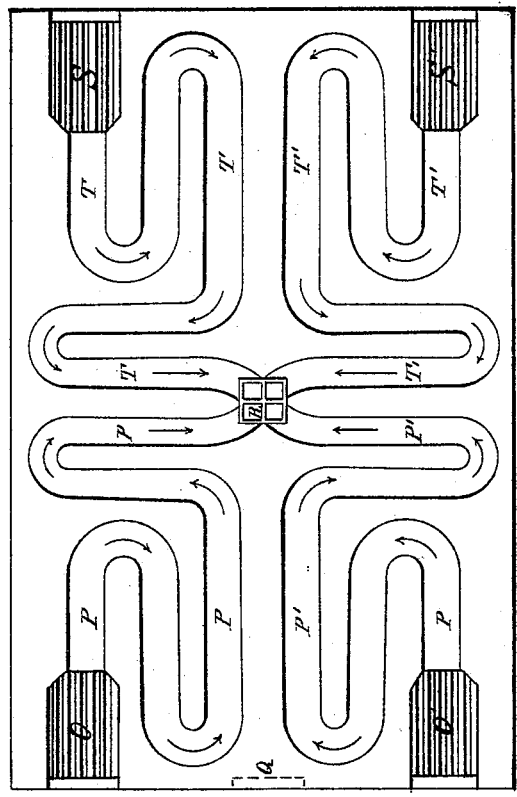

Figure 4 is a plan of the flues, with the pans removed.

The nature of my invention consists in the arrangement and combination of the soaking-pans, drying-pans, and the zigzag flues, as constructed and arranged to operate as hereinafter specified.

I use a series of shallow flat pans, made of boiler iron, or thin cast iron. A large pan is placed in front of the apparatus, and is used for boiling the brine. A narrow pan is situated behind said boiling-pans, with a space between, forming a walk or passage. Another narrow pan is placed behind the former, with a space between, forming another walk or passage, in the centre of which a chimney is placed. These narrow pans are used for drying the salt after it has been scraped from the boiling-pans. A large boiling-pan is situated at the back of the apparatus, similar in size to the forward boiling-pan, and with a walk or passage between it and the second drying-pan. A reservoir or tank is placed directly over this boiling-pan, elevated about three feet, and sitting on upright posts, one at each corner; it is made of wood, and used as a soaking-pan. Doors are suspended from the sides of this reservoir, and cover the space between it and the lower boiling-pan, forming tight joints when closed, to prevent the steam from the boiling-pan escaping, and thereby warming the reservoir or soaking-pan above, an escape pipe being placed in the centre, to carry off the surplus steam. The forward pan is also provided with a reservoir or soaking-pan, which works in a similar manner, but it is not shown in the drawings. There are two furnaces in the brick-work, under the forward boiling-pan, and two in the rear, under the back boiling-pan; said furnaces connect with flues, which run backwards and forward several times under the boiling-pans, then, taking a transverse direction under the drying-pans, finally connect with the main chimney situated in the centre of the walk or passage between the same, thus effectually distributing the heat from said furnaces over the bottom surface of the boiling-pans, and causing an equal evaporation. After the salt water has been boiled for several hours, and the magnesia, sulphur, and other mineral substances have been removed effectually, the salt is then scraped from the boiling-pan into the drying-pans, and a fresh supply of water, which has been soaking in the reservoirs or soaking-pans, falls through the holes in the bottom of the same, the plugs being removed for that purpose. By this process, a better and purer quality of salt can be produced for curing meat, or for other purposes; and, when diluted in water, no impurities float—a test by which the quality of other salt is easily discovered.

A represents a flat, shallow boiling-pan, resting on the brick-work B, in the forward part. C is another boiling-pan, in the rear part of the brick-work B. D and E are two narrow pans, used for drying the salt. F is the floor, which is level with the bottom of the pans. G, H, and I are spaces between the drying and boiling-pans, which form walks or passages. K is a reservoir or soaking-pan, elevated above the boiling-pan C, and resting on uprights $k$, at each corner. L L L L are a series of doors, secured to the reservoir or soaking-pan K by means of hinges. Said doors, when closed, cover the space between it and the boiling-pan C, and are perfectly steam-tight. M is a flue in the reservoir or soaking-pan, K, to carry off the surplus steam. N N N N are plugs in the bottom of the same, by removing which the salt water or brine falls into the boiling-pan C, underneath. O O are furnaces, that are intended to be built either at each end or in the centre, at the forward part of the brick-work, connected to the flues P P, which run transversely beneath the boiling and drying-pans A and D, and connected with a chimney, R, situated in the centre of the walk or passage H. S S are the furnaces in the rear part, and connected with the flues T T, which run transversely under the boiling-pan C and drying-pan E, and also connect with the main chimney R.

What I claim as my invention, and desire to secure by Letters Patent, is—

The arrangement and combination of the soaking-pan K, drying-pans D and E, with the zigzag flues P and T, when arranged and operating as herein described, and for the purposes set forth.

HENRY BESCHKEE.

Witnesses:
J. FRANKLIN REIGART,
JOHN S. HOLLINGSHEAD.